Figure 1:
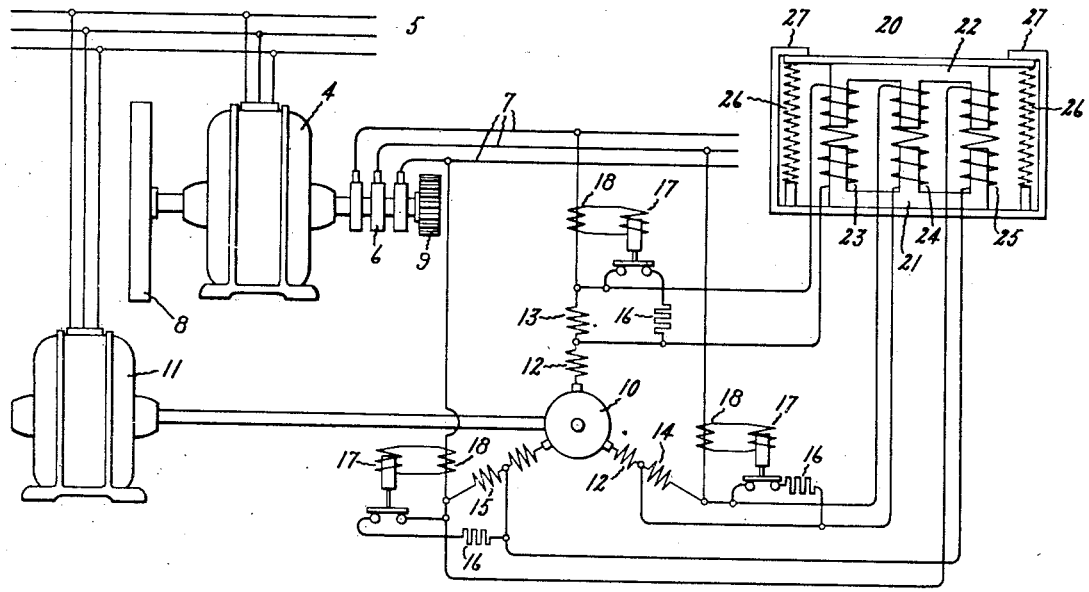

N. SHUTTLEWORTH AND G. M. BROWN.
INDUCTION MOTOR CONTROL.
APPLICATION FILED MAR. 16, 1916.

1,304,210.

Patented May 20, 1919.

Inventors:
Newton Shuttleworth,
George M. Brown,
by Albert G. Davis
Their Attorney.

UNITED STATES PATENT OFFICE.

NEWTON SHUTTLEWORTH AND GEORGE MATTHEWS BROWN, OF RUGBY, ENGLAND, ASSIGNORS TO GENERAL ELECTRIC COMPANY, A CORPORATION OF NEW YORK.

INDUCTION-MOTOR CONTROL.

1,304,210.

Specification of Letters Patent.

Patented May 20, 1919.

Application filed March 16, 1916. Serial No. 84,701.

*To all whom it may concern:*

Be it known that we, NEWTON SHUTTLEWORTH and GEORGE MATTHEWS BROWN, subjects of the King of Great Britain, residing at Rugby, county of Warwickshire, England, have invented certain new and useful Improvements in Induction-Motor Controls, of which the following is a specification.

Our invention relates to induction motor control and more particularly to the speed control of an induction motor which drives a fly wheel.

Where asynchronous machines, such as induction motors, are utilized for driving loads which are subject to rapid and wide load variation, it is common practice to mount a fly wheel upon the shaft of the motor and then to provide some control so that the stored up kinetic energy of the fly wheel may be used to assist its driving motor at the time of peak loads. Such a control arrangement should automatically decrease the speed of the induction motor, when the load increases, so as to cause the fly wheel to give up energy and should increase its speed when the load is light so as to allow the fly wheel to speed up and absorb energy.

One of the commonest methods of reducing the speed of an induction motor is to introduce resistance in the secondary circuit. Such resistance control is, however, uneconomical and it has been proposed to connect a commutator machine in cascade with the induction motor and to control the speed of the motor by regulating the excitation of the commutator machine. For fly wheel control this commutator machine is commonly series excited so that it automatically increases its terminal E. M. F. and slows down the induction motor as the peak load comes on. The use of such machines is more economical since they may be arranged to utilize the energy otherwise dissipated in resistance and they are further advantageous because of their ability to improve the power factor of the induction motor.

With such an arrangement, however, the decrease in speed is wholly gradual from the initial or synchronous speed at no load to the full amount obtainable at peak loads. It is most desirable, however, to give the induction motor a speed characteristic such that the speed remains practically constant until full load is reached and which then commences to droop rather sharply so that for any predetermined overload the speed reduction may amount to twenty or thirty per cent. Such a characteristic possesses the advantage that, when full load has been reached, the fly wheel is running at maximum speed and therefore retains the whole of its stored energy ready to be given up when the overload occurs.

Our invention, then, consists in providing a control arrangement for a system of the character described such that the desired characteristic may be obtained.

Figure 2:
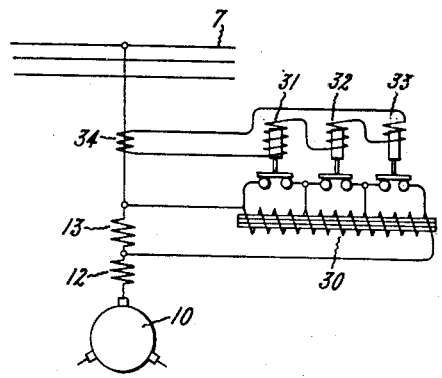
Figure 3:
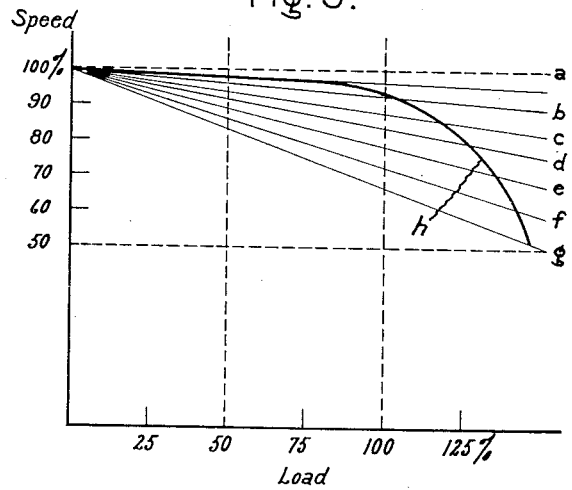

For a fuller understanding of our invention, reference is had to the following description taken in connection with the accompanying drawing in which Figure 1 is a diagram showing one possible arrangement for carrying out our invention; Fig. 2 is a fragmentary view showing a modified arrangement, and Fig. 3 is a diagram showing various speed characteristics.

Referring first to Fig. 1, it will be seen that our arrangement preferably includes an asynchronous or induction motor 4 whose primary winding is connected to the mains 5 and whose secondary winding is connected to the slip rings 6 from which are brought out the conductors 7. Mounted to be rotated by this motor and preferably mounted on the same shaft is a fly wheel 8, and the motor will be connected in any suitable manner, as for example by the gear 9, to drive a load. For the purpose of controlling the speed of this motor, we have provided a commutator machine 10 whose commuted winding is connected in cascade to the conductors 7 and which is mechanically connected to an asynchronous machine 11 whose primary winding is connected to the source of supply 5, said machine being of such a character that it will operate either as a motor or a generator. In the ordinary arrangement, where the motor 4 runs at a speed below synchronous speed, the commutator machine will act as a motor and drive the machine 11 to supply electrical power to the mains 5. This commutator machine is preferably provided with a compensating winding 12 connected in series with the brushes and with exciting windings 13, 14 and 15 which are also connected in series so that the current flowing therethrough is proportional to the secondary current of the main induction motor and consequently to the load carried by this machine.

As we have already pointed out, it is desirable that the speed of the main induction motor 4 and consequently of the fly wheel 8 should be maintained as high as possible until some predetermined load, full load for example, is reached. In order to attain this result, it may be desirable to shunt the exciting windings of the commutator machine with small resistances 16 which are designed to carry practically all the current flowing between the commutator machine and the secondary winding of the main induction motor. Electromagnetic switches 17, connected to transformers 18 so that they are responsive to the secondary currents and to the load on the main induction motor, are then provided for opening these shunts when a predetermined load is attained. Inasmuch, however, as such an arrangement will necessarily produce a very abrupt change in the excitation of the commutator machine and hence in the speed of the main induction motor, it will generally be found preferable to provide in conjunction therewith a reactance device 20 comprising cores 21 and 22 and windings 23, 24 and 25 which are connected in shunt with the exciting windings 13, 14 and 15 respectively, and together with said cores constitute reactances. These cores 21 and 22 will then be arranged so that they may be relatively movable and conveniently will be held apart by means of springs 26 so that, owing to the mutual attraction between the two cores, the separation therebetween will depend upon the current flowing through the windings 23, 24 and 25. It therefore follows that the larger the current flow through these windings, the greater will be the mutual attraction between the cores and hence more and more iron will be included within the windings. This will result in increasing the inductance of the reactances comprising the windings 23, 24 and 25 so that as the load current traversing the secondary windings of the asynchronous machine 11 increases an increasing proportion thereof will be forced to pass through the exciting windings of the commutator machine. Preferably some such arrangement as that shown diagrammatically at 27 will be provided in order that the springs 26 may be given an initial tension, thereby duplicating the action of the resistance shunts 16 with their switches 17 so that the latter may be omitted entirely if desired.

The arrangement illustrated in Fig. 1 is intended to be purely diagrammatic and to illustrate only one conception of the many possible ways of varying the effect of the reactances shunted around the exciting windings of the commutator machine. One other possible arrangement is illustrated in Fig. 2 in which a fragment of the commutator machine 10 is shown with windings 12 and 13 connected to one of the conductors 7. In this case the exciting winding 13 is shunted by the reactance 30 which is divided into sections and adapted to be rendered effective by means of electromagnetic switches or contactors 31, 32 and 33 which are supplied with current from the transformer 34 so that they are responsive to the load on the main induction motor. As is indicated in the diagram these switches 31, 32 and 33 are preferably designed to open at different values of current so that portions of the reactance 30 will be inserted at any desired point.

It will therefore be seen that we have provided an arrangement for controlling the speed of the main induction motor in which a commutator machine is connected in cascade with the secondary winding of the main motor and in a well understood manner made to control the speed of said motor by varying the E. M. F. which must be generated at the terminals of the secondary winding. Inasmuch as this commutator machine is used for driving a generator connected to the supply mains, the energy which would otherwise be used up in resistances may be returned to the source of supply and a very economical operation obtained. The fact that the proper design of commutator machine will also enable it to be used to supply wattless currents to the main induction motor is well understood in the art and needs no further explanation here.

If the speed of the induction motor driven fly wheel were controlled by means of resistance or by means of the series excited commutator machine alone, then according to the design of the resistance or the commutator machine, the speed characteristic of the set could be made to coincide with any one of the characteristics $a$ to $g$ as shown in Fig. 3, in each of which it will be seen that the reduction of speed with increasing load is gradual and continuous from no load to full load or overload. We have previously pointed out that such a gradual reduction of speed is not the most desirable characteristic and for the sake of illustration we have shown in Fig. 3 a characteristic $h$ in which the speed of the induction motor and hence the fly wheel is maintained practically constant until some predetermined load in the neighborhood of full load is attained and then the characteristic made to droop very sharply so that for any particular peak load, the reduction of speed attainable may be as much as possible. It will be evident from the previous description that we may obtain this characteristic by any one of several arrangements, either by using the resistance shunts 16 in conjunction with the reactance 20 or the reactance 30 or that we may omit the resistance shunts 16 and depend upon the initial tension at the springs 26 or the low current setting of the relay 31 to allow practically all of the current flow between the secondary bus bars 7 and the commutator machine 10 to be shunted around the exciting windings until a predetermined load is reached. After this load has been obtained, the speed characteristic may be readily determined by proper design of the springs 26 or of the contactors utilized to insert portions of the reactance 30.

While we have herein illustrated and described certain particular ways by means of which the desired result may be obtained, we wish it understood that we do not desire to be limited thereto and seek to cover in the appended claims all those variations and modifications which come within the scope of our invention.

What we claim as new and desire to secure by Letters Patent of the United States, is,—

1. In combination, an asynchronous machine, a fly-wheel rotated thereby, a dynamo-electric commutator machine having a commuted winding connected to the secondary winding of said asynchronous machine, and means responsive to the load on said asynchronous machine for abruptly increasing the excitation of said commutator machine when a predetermined load is reached.

2. In combination, an asynchronous machine, a fly wheel rotated thereby, a dynamo-electric commutating machine having a commuted winding and an exciting winding connected in series with each other to the secondary winding of said asynchronous machine, a reactance connected in shunt to said exciting winding, and means responsive to the load on said asynchronous machine for varying the effectiveness of said reactance to abruptly increase the excitation of said commutator machine when a predetermined load is reached.

3. In combination, an asynchronous machine, a fly wheel rotated thereby, a dynamo-electric commutating machine having a commuted winding and an exciting winding connected in series with each other to the secondary winding of said asynchronous machine, a reactance in shunt to said exciting winding, and means responsive to the load on said asynchronous machine for varying the inductance of said reactance to abruptly increase the excitation of said commutator machine when a predetermined load is reached.

4. In combination, an asynchronous machine, a fly-wheel rotated thereby, a dynamo-electric commutator machine having its commuted winding connected in cascade with the secondary winding of said asynchronous machine through its exciting winding, a reactance shunt for said exciting winding, a resistance shunt for said exciting winding and said reactance, means responsive to the load on said asynchronous machine for removing said resistance shunt when a predetermined load is reached, and means also responsive to said load for varying the effectiveness of said reactance to then abruptly increase the flow of current in said exciting winding.

In witness whereof, we have hereunto set our hands this fourteenth day of February, 1916.

NEWTON SHUTTLEWORTH.
GEORGE MATTHEWS BROWN.

Witnesses:
CHARLES D. FULLER,
J. A. FOSTER.